(12) United States Patent
Jiang

(10) Patent No.: US 11,848,885 B2
(45) Date of Patent: Dec. 19, 2023

(54) SYSTEM INFORMATION RECEPTION METHOD AND APPARATUS, AND SYSTEM INFORMATION TRANSMISSION METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 183 days.

(21) Appl. No.: 16/966,987

(22) PCT Filed: Feb. 5, 2018

(86) PCT No.: PCT/CN2018/075275
§ 371 (c)(1),
(2) Date: Aug. 3, 2020

(87) PCT Pub. No.: WO2019/148495
PCT Pub. Date: Aug. 8, 2019

(65) Prior Publication Data
US 2021/0036830 A1 Feb. 4, 2021

(51) Int. Cl.
*H04W 36/00* (2009.01)
*H04L 5/00* (2006.01)
(Continued)

(52) U.S. Cl.
CPC .......... *H04L 5/0053* (2013.01); *H04L 5/0032* (2013.01); *H04L 5/0096* (2013.01);
(Continued)

(58) Field of Classification Search
CPC ... H04L 5/0053; H04L 5/0032; H04L 5/0096; H04W 24/02; H04W 48/14
See application file for complete search history.

(56) References Cited

U.S. PATENT DOCUMENTS

2014/0094146 A1  4/2014 Xu et al.
2017/0311285 A1* 10/2017 Ly ..................... H04W 72/30
(Continued)

FOREIGN PATENT DOCUMENTS

CN   101754296 A   6/2010
CN   102045759 A   5/2011
(Continued)

OTHER PUBLICATIONS

Examination Report for Indian Application No. 202047037708, dated Nov. 24, 2021.
(Continued)

*Primary Examiner* — Jae Y Lee
*Assistant Examiner* — Aixa A Guadalupe Cruz
(74) *Attorney, Agent, or Firm* — Finnegan, Henderson, Farabow, Garrett & Dunner, L.L.P

(57) ABSTRACT

Embodiments of the present disclosure provide a system information reception method applied to user equipment. The method includes: determining a cell corresponding to system information to be obtained; transmitting a request message to a base station for requesting the system information of the cell, where the request message includes indication information of the cell; and receiving the system information of the cell transmitted by the base station.

12 Claims, 6 Drawing Sheets

Determine a cell corresponding to system information to be obtained — S11

Transmit a request message requesting the system information of the cell to a base station, where the request message includes indication information of the cell — S12

Receive the system message of the cell from the base station — S13

(51) Int. Cl.
*H04W 24/02* (2009.01)
*H04W 36/28* (2009.01)

(52) U.S. Cl.
CPC ....... *H04W 24/02* (2013.01); *H04W 36/0069* (2018.08); *H04W 36/00695* (2023.05); *H04W 36/00698* (2023.05); *H04W 36/28* (2013.01)

(56) References Cited

U.S. PATENT DOCUMENTS

| | | | |
|---|---|---|---|
| 2018/0013524 A1* | 1/2018 | Chien | H04L 5/005 |
| 2019/0124715 A1* | 4/2019 | Chen | H04W 48/14 |
| 2019/0174554 A1* | 6/2019 | Deenoo | H04W 72/0453 |
| 2019/0215862 A1* | 7/2019 | Kim | H04W 74/0833 |
| 2019/0289532 A1* | 9/2019 | Yi | H04L 1/1614 |
| 2019/0342824 A1* | 11/2019 | Futaki | H04W 76/15 |

FOREIGN PATENT DOCUMENTS

| | | |
|---|---|---|
| CN | 103179513 A | 6/2013 |
| CN | 106714272 A | 5/2017 |
| CN | 107223353 A | 9/2017 |
| EP | 1 562 387 A1 | 8/2005 |
| WO | WO 2017/023128 A1 | 2/2017 |
| WO | WO 2017/197063 A1 | 11/2017 |

OTHER PUBLICATIONS

State Intellectual Property Office of the People's Republic of China, Office Action and Search Report Issued in Application No. 201880000125.0, dated May 6, 2021, 15 pages.
European Patent Office, Extended European Search Report Issued in Application No. 18903432.5, dated Jan. 21, 2021, 12 pages.
Lenovo, Motorola Mobility, "Details of On-demand SI requests", 3GPP TSG-RAN WG2 Meeting #97bis, R2-1702733, Spokane, USA, Apr. 3-7, 2017, 4 pages.
Fujitsu, "Considerations of on-demand SI request", 3GPP TSG-RAN WG2 Meeting #97bis, R2-1703234, Spokane, USA, Apr. 3-7, 2017, 4 pages.
ISA State Intellectual Property Office of the People's Republic of China, International Search Report Issued in Application No. PCT/CN2018/075275, dated Oct. 22, 2018, WIPO, 4 pages.
3rd Generation Partnership Project; Technical Specification Group Radio Access Network; NR; Radio Resource Control (RRC) protocol specification (Release 16), 3GPP TS 38.331, V16.0.0, Mar. 2020, 833 pages.
State Intellectual Property Office of the People's Republic of China, Office Action and Search Report Issued in Application No. 201880000125.0, dated Sep. 2, 2021, 16 pages.
State Intellectual Property Office of the People's Republic of China, Office Action and Search Report Issued in Application No. 2018800001250, dated Sep. 1, 2020, 15 pages.
ISA State Intellectual Property Office of the People's Republic of China, Written Opinion of the International Searching Authority Issued in Application No. PCT/CN2018/075275, dated Oct. 22, 2018, 9 pages.

* cited by examiner

If the cell determined based on the indication information of the cell belongs to another base station than the base station, obtain the system information of the cell from the another base station ~S521
FIG. 8
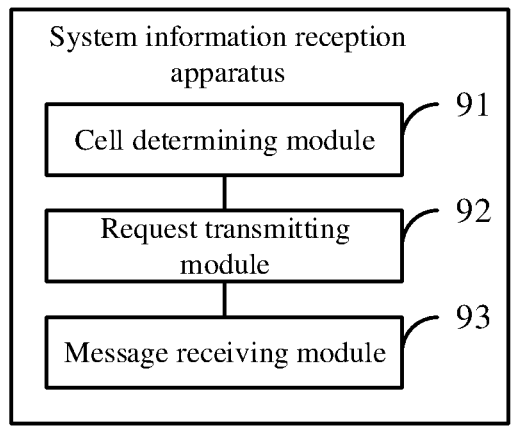
FIG. 9
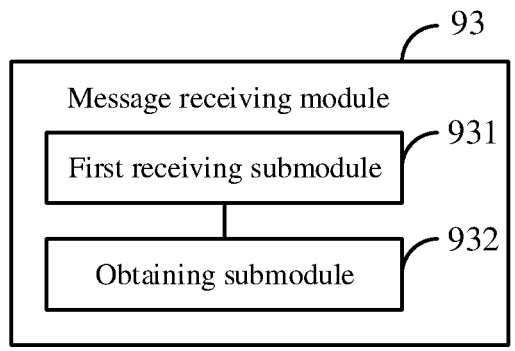
FIG. 10
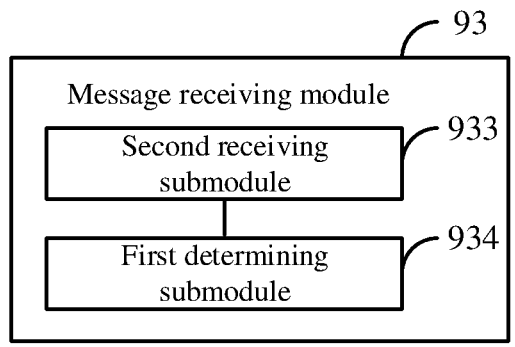
FIG. 11

SYSTEM INFORMATION RECEPTION METHOD AND APPARATUS, AND SYSTEM INFORMATION TRANSMISSION METHOD AND APPARATUS

CROSS REFERENCE TO RELATED APPLICATIONS

This application is a national phase application based on International Application No. PCT/CN2018/075275, filed Feb. 5, 2018, the content of which is incorporated herein by reference.

TECHNICAL FIELD

The present disclosure relates to the field of communication technology, and in particular, to a system information reception method, a system information reception apparatus, a system information transmission method, a system information transmission apparatus, an electronic device, and a computer-readable storage medium.

BACKGROUND 5G system information transmitted from a base station to user equipment includes minimum system information and other system information. The minimum system information is transmitted to the user equipment by broadcast; for the other system information, some types of the other system information are transmitted to the user equipment in an on-demand manner, that is, transmitted to the user equipment in response to receiving a request from the user equipment, and while other types of the other system information are transmitted to the user equipment by broadcast.

At present, when user equipment requests system information from a base station, the base station by default returns system information of a PCell (primary cell) to the user equipment, which limits the system information that the user equipment can obtain and may cause the user equipment to be unable to carry out certain services because not obtaining the required system information.

SUMMARY

In view of this, embodiments of the present disclosure provide a system information reception method, a system information reception apparatus, a system information transmission method, a system information transmission apparatus, an electronic device, and a computer-readable storage medium.

According to a first aspect of the embodiments, there is provided a system information reception method applied to user equipment, and the method includes:
  determining a cell corresponding to system information to be obtained;
  transmitting a request message to a base station for requesting the system information of the cell, where the request message includes indication information of the cell; and
  receiving the system information of the cell from the base station.

Optionally, in response to that the cell is not a primary cell, and/or in response to that the cell does not belong to a secondary cell group, the request message includes the indication information of the cell.

Optionally, the cell is a serving cell to the user equipment, and the request message includes a radio resource control message.

Optionally, the cell is a non-serving cell to the user equipment, and the request message includes a radio resource control message, and/or a first message or a third message of random access.

Optionally, the indication information of the cell includes a global network unique cell identity of the cell and/or a cell index of the cell.

Optionally, receiving the system information from the base station includes:
  receiving a response message which is transmitted by the base station to the user equipment in response to the request message; and
  obtaining the system information from the response message.

Optionally, receiving the system information from the base station includes:
  receiving a response message which is transmitted by the base station to the user equipment in response to the request message;
  determining a time window for receiving the system information based on the response message; and
  receiving the system information broadcast by the base station in the time window.

Optionally, receiving the system information from the base station includes:
  determining a time window for receiving the system information based on pre-stored configuration information; and
  receiving the system information broadcast by the base station in the time window.

Optionally, the user equipment is configured with a master cell group and a secondary cell group, where,
  in response to that the cell of which the system information is to be obtained belongs to the master cell group, transmitting the request message to the base station for requesting the system information of the cell includes:
  transmitting the request message to a master base station corresponding to the master cell group through a signaling radio bearer of the master base station; and
  in response to that the cell of which the system information is to be obtained belongs to the secondary cell group, transmitting the request message to the base station for requesting the system information of the cell includes:
  transmitting the request message to a secondary base station corresponding to the secondary cell group through a signaling radio bearer of the secondary base station.

According to a second aspect of the embodiments, there is provided a system information transmission method applied to a base station, the method includes:
  receiving a request message from user equipment for requesting system information, where the request message includes indication information of a cell to which the system information belongs and indication information of the system information;
  determining the cell based on the indication information of the cell, and the system information based on the indication information of the system information; and
  transmitting the system information of the cell to the user equipment.

Optionally, transmitting the system information of the cell to the user equipment includes:
transmitting a response message associated with the request message to the user equipment, where the response message includes the system information.

Optionally, transmitting the system information of the cell to the user equipment includes:
transmitting a response message to the user equipment in response to the request message, where the response message indicates a time window in which the user equipment receives the system information; and
broadcasting the system information.

Optionally, determining the cell based on the indication information of the cell, and the system information based on the indication information of the system information includes:
in response to that the cell determined based on the indication information of the cell belongs to another base station than the base station, obtaining the system information of the cell from the another base station.

According to a third aspect of the embodiments, there is provided a system information reception apparatus applied to user equipment, the apparatus includes:
a cell determining module configured to determine a cell corresponding to system information to be obtained;
a request transmitting module configured to transmit a request message to a base station for requesting the system information of the cell, where the request message includes indication information of the cell; and
a message receiving module configured to receive the system information of the cell from the base station.

Optionally, in response to that the cell is not a primary cell, and/or in response to that the cell does not belong to a secondary cell group, the request message includes the indication information of the cell.

Optionally, the cell is a serving cell to the user equipment, and the request message includes a radio resource control message.

Optionally, the cell is a non-serving cell to the user equipment, and the request message includes a radio resource control message, and/or a first message or a third message of random access.

Optionally, the indication information of the cell includes a global network unique cell identity of the cell and/or a cell index of the cell.

Optionally, the message receiving module includes:
a first receiving submodule configured to receive a response message which is transmitted by the base station to the user equipment in response to the request message; and
an obtaining submodule configured to obtain the system information from the response message.

Optionally, the message receiving module includes:
a second receiving submodule configured to receive a response message which is transmitted by the base station to the user equipment in response to the request message; and
a first determining submodule configured to determine a time window for receiving the system information based on the response message,
where the second receiving submodule is further configured to receive the system information broadcast by the base station in the time window.

Optionally, the message receiving module includes:
a third determining submodule configured to determine a time window for receiving the system information based on pre-stored configuration information; and
a second determining submodule configured to receive the system information broadcast by the base station in the time window.

Optionally, the user equipment is configured with a master cell group and a secondary cell group, where,
in response to that the cell of which the system information is to be obtained belongs to the master cell group, the request transmitting module is configured to transmit the request message to a master base station corresponding to the master cell group through a signaling radio bearer of the master base station; and
in response to that the cell of which the system information is to be obtained belongs to the secondary cell group, the request transmitting module is configured to transmit the request message to a secondary base station corresponding to the secondary cell group through a signaling radio bearer of the secondary base station.

According to a fourth aspect of the embodiments, there is provided a system information transmission apparatus applied to a base station, the apparatus includes:
a request receiving module configured to receive a request message from user equipment for requesting system information, where the request message includes indication information of a cell to which the system information belongs and indication information of the system information;
a determining module configured to determine the cell based on the indication information of the cell, and the system information based on the indication information of the system information; and
a message transmitting module configured to transmit the system information of the cell to the user equipment.

Optionally, the message transmitting module includes:
a first response submodule configured to transmit a response message associated with the request message to the user equipment, where the response message includes the system information.

Optionally, the message transmitting module includes:
a second response submodule configured to transmit a response message to the user equipment in response to the request message, where the response message indicates a time window in which the user equipment receives the system information; and
a broadcasting submodule configured to broadcast the system information.

Optionally, the determining module includes:
an obtaining submodule configured to obtain, in response to that the cell determined based on the indication information of the cell belongs to another base station than the base station, the system information of the cell from the another base station.

According to a fifth aspect of the embodiments, there is provided an electronic device, including:
a processor; and
a memory for storing instructions executable by the processor,
where the processor is configured to execute the system information reception method described in any of the above embodiments.

According to a sixth aspect of the embodiments, there is provided an electronic device, including:
a processor; and
a memory for storing instructions executable by the processor, where the processor is configured to execute the system information transmission method described in any of the above embodiments.

According to a seventh aspect of the embodiments, there is provided a computer-readable storage medium storing a computer program that, when executed by a processor, implements the system information reception method described in any of the above embodiments.

According to an eighth aspect of the embodiments, there is provided a computer-readable storage medium storing a computer program that, when executed by a processor, implements the system information transmission method described in any of the above embodiments.

According to the embodiments of the present disclosure, the user equipment sends the request message including the indication information of the cell to the base station, such that the base station can determine the cell which the user equipment needs to obtain system information from, and then transmit the corresponding system information of the corresponding cell to the user equipment, thereby ensuring that the user equipment is not limited in the system information that the user equipment can be obtain, so as to avoid a case where a certain service cannot be performed due to unavailability of required system information to the user equipment.

BRIEF DESCRIPTION OF THE DRAWINGS

To more clearly explain the technical solutions in the embodiments of the present application, the drawings required in describing the embodiments will be briefly described below. Obviously, the drawings in the following description are only some embodiments of the present application. And a person of ordinary skill in the art can obtain other drawings based on these drawings without paying any creative effort.

FIG. 8 is a flowchart illustrating a process of determining system information according to an embodiment of the present disclosure.

FIG. 9 is a block diagram illustrating a system information reception apparatus according to an embodiment of the present disclosure.

FIG. 10 is a block diagram illustrating a message receiving module according to an embodiment of the present disclosure.

FIG. 11 is a block diagram illustrating another message receiving module according to an embodiment of the present disclosure.

DETAILED DESCRIPTION OF THE EMBODIMENTS

The technical solutions in the embodiments of the present application will be described clearly and completely in conjunction with the drawings in the embodiments of the present application. Obviously, the described embodiments represent only part of the embodiments of the present application, but not all the embodiments. Based on the embodiments in the present application, all other embodiments obtained by those of ordinary skill in the art without creative effort fall within the protection scope of the present application.

Figure 1:
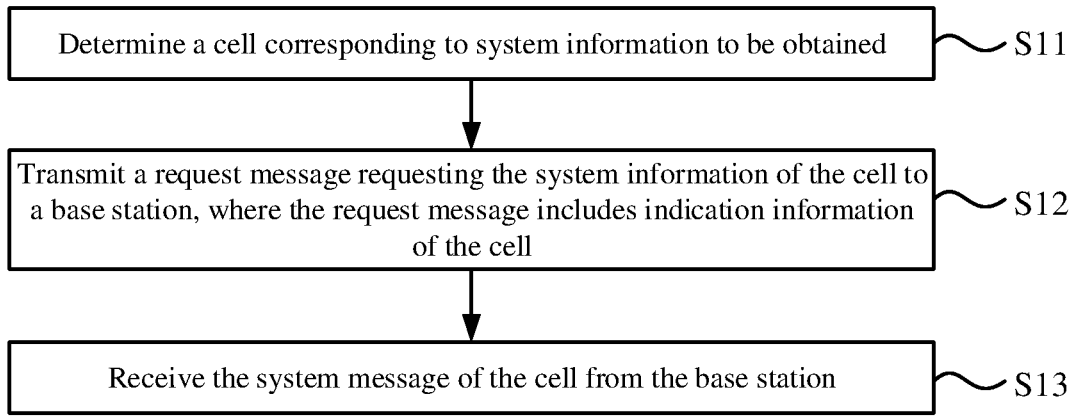
FIG. 1 is a flowchart illustrating a system information reception method according to an embodiment of the present disclosure.

FIG. 1 is a flowchart illustrating a system information reception method according to an embodiment of the present disclosure. The system information reception method shown in this embodiment may be applied to user equipment, such as mobile phones, tablet computers, etc., where the user equipment may be user equipment in a connected state with a base station. As shown in FIG. 1, the method may include the following steps.

At step S11, a cell corresponding to system information to be obtained is determined, where the system information may be other system information among pieces of 5G system information.

In an embodiment, the user equipment may determine system information based on a required service, for example, if MBMS (Multimedia Broadcast Multicast Service) is required, then a search may be performed on system information related to the MBMS (for example, determining the system information related to the MBMS based on received system information from cells in the past), and a cell corresponding to the system information is then determined, so that the system information to be obtained can be determined as the system information related to the MBMS of the cell.

At step S12, a request message is transmitted to a base station for requesting the system information of the cell, where the request message includes indication information of the cell.

In an embodiment, the indication information of the cell may indicate, to the base station, the cell to which the system information to be obtained by the user equipment corresponds. The indication information of the cell may be a cell index of the cell, a global network unique cell identity of the cell, etc.

In an embodiment, in addition to the indication information of the cell, the request message may also include indication information of the system information. The indication information of the system information indicates, to the base station, which system information of the cell is the system information to be obtained by the user equipment, and may be an identity of the system information, an index of the system information, a bitmap of the system information, etc.

At step S13, the system information of the cell from the base station is received.

In an embodiment, by sending a request message including the indication information of the cell to the base station, the base station can determine the cell which the user equipment needs to obtain system information from, and then the corresponding system information of the corresponding cell can be transmitted to the user equipment, thereby ensuring that the user equipment is not limited in the system information that the user equipment can be obtained, so as to avoid a case where a certain service cannot be performed due to unavailability of required system information to the user equipment.

Optionally, when the cell is not a primary cell, and/or when the cell does not belong to a secondary cell group, the request message includes the indication information of the cell.

In an embodiment, when the cell is not the primary cell, and/or does not belong to the secondary cell group (SCG), the request message includes the indication information of the cell, in other words, when the cell is the primary cell or belongs to the secondary cell group, the request message may include no indication information of the cell.

For example, when the cell is the primary cell, the request message transmitted by the user equipment to the base station may include no indication information of the primary cell. In this case, the base station transmits the system information of the primary cell to the user equipment by default.

For example, when the cell belongs to the secondary cell group, the user equipment may transmit the request message to a secondary base station (SgNB) corresponding to a secondary cell through a signaling radio bearer (SRB) of the secondary base station, and the request message may include no indication information of the cell. In this case, the secondary base station transmits the system information of the cell belonging to the secondary cell group to the user equipment by default.

Optionally, the cell is a serving cell to the user equipment, and the request message includes a radio resource control (RRC) message.

In an embodiment, the user equipment may transmit the request message to the base station in the form of the RRC message.

Optionally, the cell is a non-serving cell to the user equipment, and the request message includes an RRC message, and/or a first message (MSG1) or a third message (MSG3) of random access.

In an embodiment, if the cell is a non-serving cell to the user equipment, the user equipment may transmit a request message to the base station in the form of the RRC message. In this case, the RRC message may be sent by the user equipment to a base station of a serving cell, and the RRC message may be forwarded by the base station associated with the serving cell to a base station of the non-serving cell.

In an embodiment, if the cell is a non-serving cell to the user equipment, the request message may also be carried in the first message or the third message of random access during a procedure of random accessing to the non-serving cell by the user equipment.

If the request message is carried in the first message of random access, the base station may store a correspondence between preambles and cells and system information in advance, and determine system information of a cell corresponding to the received preamble based on the correspondence. For example, if preamble A is received, then system information C of cell B can be transmitted to the user equipment based on the correspondence. For example, if preamble X is received, then system information Z of cell Y can be transmitted to the user equipment based on the correspondence.

Optionally, the indication information of the cell includes a global network unique cell identity of the cell and/or a cell index of the cell.

In an embodiment, for all cells, the indication information of the cell transmitted by the user equipment to the base station may be a cell index of the cell or a global network unique cell identity of the cell. Optionally, if the cell is a serving cell to the user equipment, the indication information can be a cell index, and if the cell is a non-serving cell to the user equipment, the indication information can be a global network unique cell identity of the cell.

Figure 2:
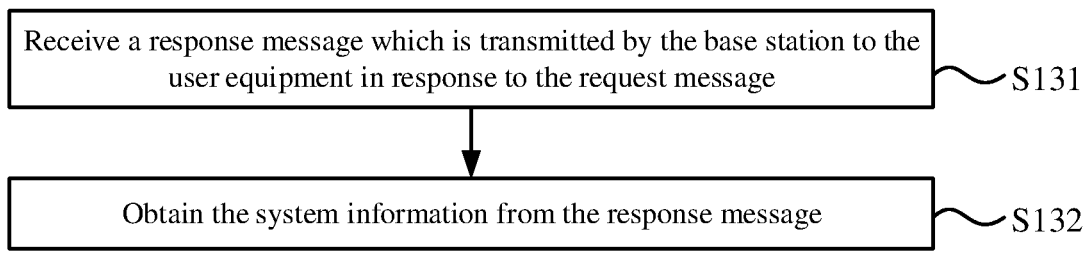
FIG. 2 is a flowchart illustrating a process of receiving system information from a base station according to an embodiment of the present disclosure.

FIG. 2 is a flowchart illustrating a process of receiving system information from a base station according to an embodiment of the present disclosure. As shown in FIG. 2, on the basis of the embodiment shown in FIG. 1, that the system information of the cell from the base station is received includes steps S131 to S132.

At step S131, a response message which is transmitted by the base station to the user equipment in response to the request message is received.

At step S132, the system information is obtained from the response message.

In an embodiment, the base station may have the system information of the cell requested by the user equipment carried in the response message, and transmit the response message to the user equipment. The user equipment may obtain the requested system information of the cell in the response message from the base station.

Figure 3:
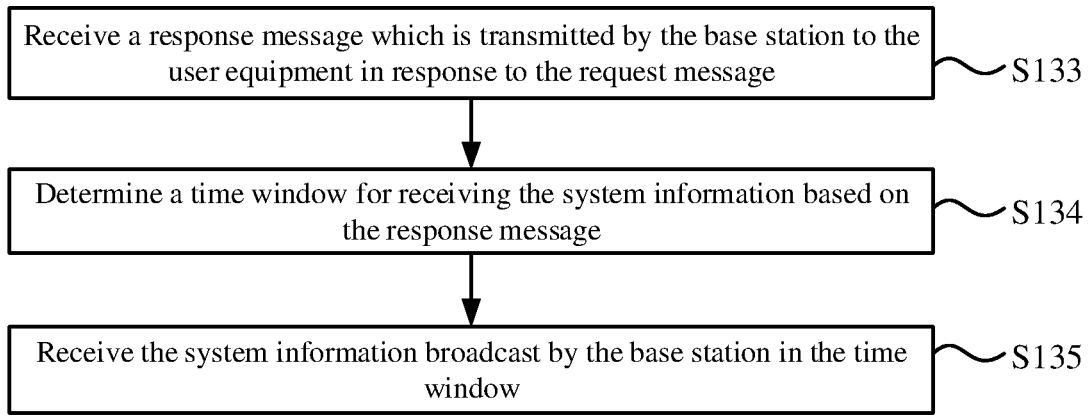
FIG. 3 is a flowchart illustrating another process of receiving system information from a base station according to an embodiment of the present disclosure.

FIG. 3 is a flowchart illustrating another process of receiving system information from a base station according to an embodiment of the present disclosure. As shown in FIG. 3, on the basis of the embodiments shown in FIG. 1, that the system information of the cell from the base station is received includes steps S133 to S135.

At step S133, a response message which is transmitted by the base station to the user equipment in response to the request message is received.

At step S134, a time window for receiving the system information is determined based on the response message.

At step S135, the system information broadcast by the base station is received in the time window.

In an embodiment, the base station may broadcast system information at certain time windows. The response message sent by the base station to the user equipment may indicate the number of time windows in which the user equipment is to monitor, and a time window offset which indicates the number of time windows that the user equipment is to skip before starting monitoring.

After receiving the response message, the user equipment can determine the time window in which the user equipment monitors, and then receive the system information of the cell broadcast by the base station in the time window in which the user equipment monitors. The response message may also carry the indication information of the cell, such that when the user equipment receives the system information during the time window indicated by the response message, the user equipment can determine that the received system information is the system information of the cell based on the indication information of the cell carried in the response message.

Figure 4:
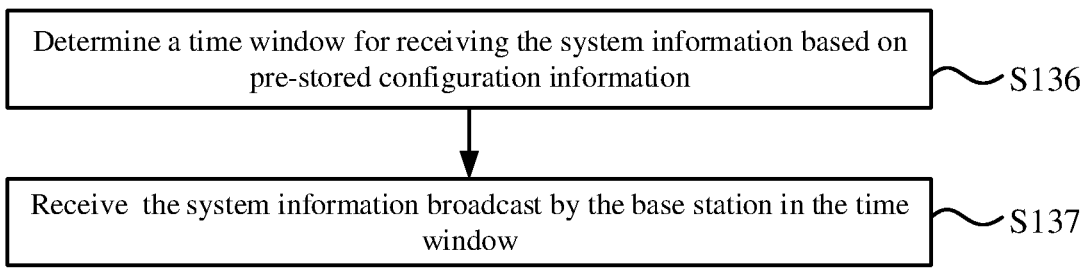
FIG. 4 is a flowchart illustrating yet another process of receiving system information from a base station according to an embodiment of the present disclosure.

FIG. 4 is a flowchart illustrating yet another process of receiving system information from a base station according to an embodiment of the present disclosure. As shown in FIG. 4, on the basis of the embodiments shown in FIG. 1, that the system information of the cell from the base station is received includes steps S136 to S137.

At step S136, a time window for receiving the system information is determined based on pre-stored configuration information.

At step S137, the system information broadcast by the base station is received in the time window.

In an embodiment, the user equipment may store the configuration information in advance, the configuration information indicates the time window in which the user equipment monitors, and then after sending the request message to the base station, the user equipment may monitor in the corresponding time window based on the pre-stored configuration information so as to receive the system information of the cell broadcast by the base station in the time window in which the user equipment monitors.

Optionally, the user equipment is configured with a master cell group (MCG) and a secondary cell group, where, if the cell corresponding to the system information belongs to the master cell group, that the request message is transmitted to the base station for requesting the system information of the cell includes:

the request message is transmitted to a master base station (MgNB) corresponding to the master cell group through a signaling radio bearer of the master base station; and if the cell corresponding to the system information belongs to the secondary cell group, that the request message is transmitted to the base station for requesting the system information of the cell includes:

the request message is transmitted to a secondary base station corresponding to the secondary cell group through a signaling radio bearer of the secondary base station.

In an embodiment, if the user equipment is configured with a master cell group and a secondary cell group, that is, the user equipment is configured with dual connectivity, then the user can communicate with both the master base station and the secondary base station.

If the cell corresponding to the system information requested by the user equipment belongs to the master cell group, the user equipment may transmit the request message to the master base station through the signaling radio bearer of the master base station, and if the cell corresponding to the system information requested by the user equipment belongs to the secondary cell group, the user equipment may transmit the request message to the secondary base station through the signaling radio bearer of the secondary base station. In view of this, the user equipment can transmit the request message to the corresponding base station based on the cell group to which the cell corresponding to the requested system information belongs, thus, interaction between the base stations is unnecessary.

Figure 5:
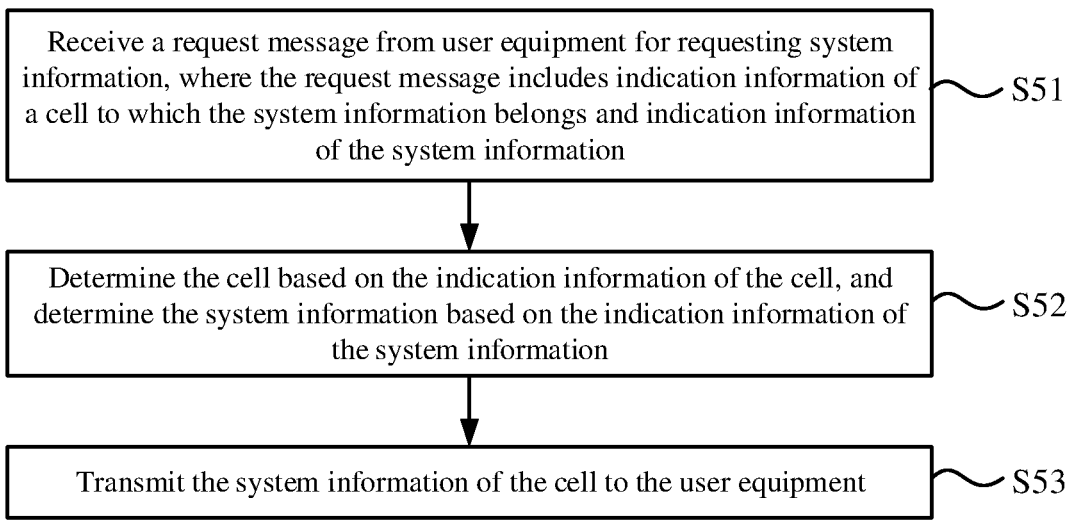
FIG. 5 is a flowchart illustrating a system information transmission method according to an embodiment of the present disclosure.

FIG. 5 is a flowchart illustrating a system information transmission method according to an embodiment of the present disclosure. The system information transmission method shown in this embodiment may be applied to a base station, such as a 5G base station.

As shown in FIG. 5, the system information transmission method may include the following steps.

At step S51, a request message from user equipment for requesting system information is received, where the request message includes indication information of a cell to which the system information belongs and indication information of the system information.

At step S52, the cell is determined based on the indication information of the cell, and the system information is determined based on the indication information of the system information.

At step S53, the system information of the cell is transmitted to the user equipment.

In an embodiment, corresponding to the embodiment shown in FIG. 1, by receiving the request message including the indication information of the cell from the user equipment, the base station can determine the cell which the user equipment is to obtain system information from, and then the corresponding system information of the corresponding cell can be transmitted to the user equipment, thereby ensuring that the user equipment is not limited in the system information that the user equipment can be obtain, so as to avoid a case where a certain service cannot be performed due to unavailability of required system information to the user equipment.

Figure 6:
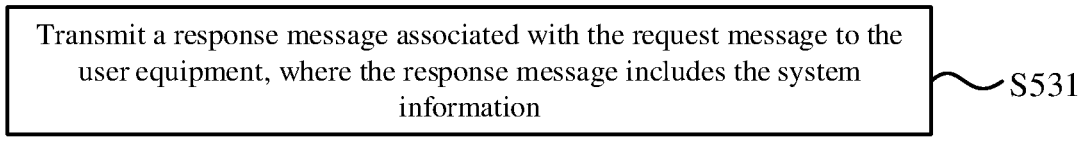
FIG. 6 is a flowchart illustrating a process of transmitting system information of a cell to user equipment according to an embodiment of the present disclosure.

FIG. 6 is a flowchart illustrating a process of transmitting system information of a cell to user equipment according to an embodiment of the present disclosure. As shown in FIG. 6, on the basis of the embodiment shown in FIG. 5, step S53, that the system information of the cell is transmitted to the user equipment includes step S531.

At step S531, a response message associated with the request message is transmitted to the user equipment, where the response message includes the system information.

In an embodiment, corresponding to the embodiment shown in FIG. 2, the system information of the cell requested by the user equipment may be carried in the response message and transmitted to the user equipment by the base station, and the user equipment may obtain the requested system information of the cell in the response message transmitted by the base station.

Figure 7:
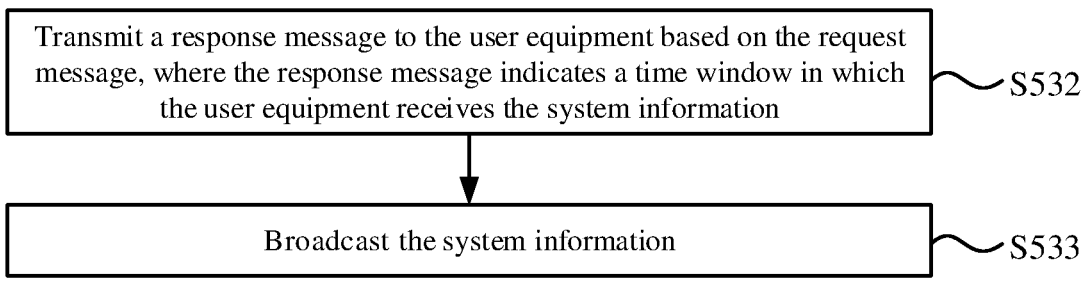
FIG. 7 is a flowchart illustrating another process of transmitting system information of a cell to user equipment according to an embodiment of the present disclosure.

FIG. 7 is a flowchart illustrating another process of transmitting system information of a cell to user equipment according to an embodiment of the present disclosure. As shown in FIG. 7, on the basis of the embodiment shown in FIG. 5, that the system information of the cell is transmitted to the user equipment includes steps S532 to S533.

At step S532, a response message is transmitted to the user equipment in response to the request message, where the response message indicates a time window in which the user equipment receives the system information.

At step S533, the system information is broadcast.

This embodiment corresponds to the embodiment shown in FIG. 3.

In the embodiment, the base station may broadcast system information at certain time windows. The response message sent by the base station to the user equipment may indicate the number of time windows in which the user equipment is to monitor, and a time window offset. For example, based on the time window offset, it is determined the number of time windows to be skipped from receiving the response message to start monitoring content broadcast by the base station.

After receiving the response message, the user equipment can determine the time window in which the user equipment monitors, and then receive the system information of the cell broadcast by the base station in the time window in which the user equipment monitors.

FIG. 8 is a flowchart illustrating a process of determining system information according to an embodiment of the present disclosure. As shown in FIG. 8, on the basis of the embodiment shown in FIG. 5, that the cell is determined based on the indication information of the cell, and the system information is determined based on the indication information of the system information includes step S521.

At step S521, if the cell determined based on the indication information of the cell belongs to another base station than the base station, the system information of the cell is obtained from the another base station.

In an embodiment, if the cell corresponding to the system information required by the user equipment does not belong to a base station connected with the user equipment, but belongs to a different base station, then after receiving the request message from the user equipment, the base station can determine the different base station to which the cell belongs based on the indication information of the cell in the request message, and the system information of the cell may be obtained from the different base station and then transmitted to the user equipment.

Corresponding to the foregoing embodiments of a system information reception method and a system information transmission method, the present disclosure also provides embodiments of a system information reception apparatus and a system information transmission apparatus.

FIG. 9 is a block diagram illustrating a system information reception apparatus according to an embodiment of the present disclosure. The apparatus may be applied to user equipment, such as mobile phones, tablet computers, etc., where the user equipment may be user equipment in a connected state. As shown in FIG. 9, the apparatus may include:
- a cell determining module 91 configured to determine a cell corresponding to system information to be obtained;
- a request transmitting module 92 configured to transmit a request message to a base station for requesting the system information of the cell, where the request message includes indication information of the cell; and
- a message receiving module 93 configured to receive the system information of the cell from the base station.

Optionally, in response to that the cell is not a primary cell, and/or in response to that the cell does not belong to a secondary cell group, the request message includes the indication information of the cell.

Optionally, the cell is a serving cell to the user equipment, and the request message includes a radio resource control message.

Optionally, the cell is a non-serving cell to the user equipment, and the request message includes a radio resource control message, and/or a first message or a third message of random access.

Optionally, the indication information of the cell includes a global network unique cell identity of the cell and/or a cell index of the cell.

FIG. 10 is a block diagram illustrating a message receiving module according to an embodiment of the present disclosure. As shown in FIG. 10, on the basis of the embodiment shown in FIG. 9, the message receiving module 93 includes:
- a first receiving submodule 931 configured to receive a response message which is transmitted by the base station to the user equipment in response to the request message; and
- an obtaining submodule 932 configured to obtain the system information from the response message.

FIG. 11 is a block diagram illustrating another message receiving module according to an embodiment of the present disclosure. As shown in FIG. 11, on the basis of the embodiment shown in FIG. 9, the message receiving module 93 includes:
- a second receiving submodule 933 configured to receive a response message which is transmitted by the base station to the user equipment in response to the request message; and
- a first determining submodule 934 configured to determine a time window for receiving the system information based on the response message,
- where the second receiving submodule 933 is further configured to receive the system information broadcast by the base station in the time window.

Figure 12:
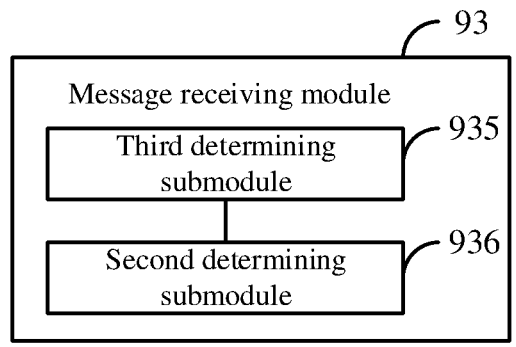
FIG. 12 is a block diagram illustrating yet another message receiving module according to an embodiment of the present disclosure.

FIG. 12 is a block diagram illustrating yet another message receiving module according to an embodiment of the present disclosure. As shown in FIG. 12, on the basis of the embodiment shown in FIG. 9, the message receiving module 93 includes:
- a third determining submodule 935 configured to determine a time window for receiving the system information based on pre-stored configuration information; and
- a second determining submodule 936 configured to receive the system information broadcast by the base station in the time window.

Optionally, the user equipment is configured with a master cell group and a secondary cell group, where,
- in response to that the cell corresponding to the system information belongs to the master cell group, the request transmitting module is configured to transmit the request message to a master base station corresponding to the master cell group through a signaling radio bearer of the master base station; and
- in response to that the cell corresponding to the system information belongs to the secondary cell group, the request transmitting module is configured to transmit the request message to a secondary base station corresponding to the secondary cell group through a signaling radio bearer of the secondary base station.

Figure 13:
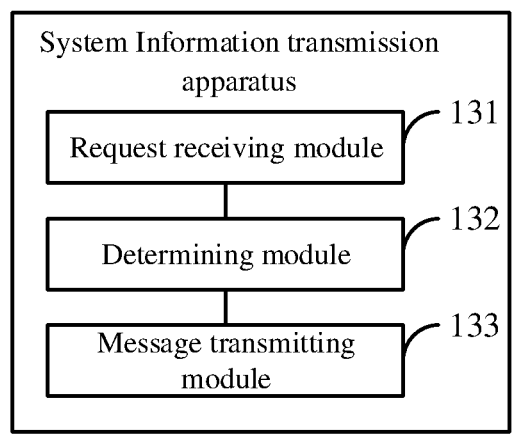
FIG. 13 is a block diagram illustrating a system information transmission apparatus according to an embodiment of the present disclosure.

FIG. 13 is a block diagram illustrating a system information transmission apparatus according to an embodiment of the present disclosure. The apparatus may be applied to a base station, such as a 5G base station. As shown in FIG. 13, the apparatus may include:
- a request receiving module 131 configured to receive a request message from user equipment for requesting system information, where the request message includes indication information of a cell to which the system information belongs and indication information of the system information;
- a determining module 132 configured to determine the cell based on the indication information of the cell, and determine the system information based on the indication information of the system information; and
- a message transmitting module 133 configured to transmit the system information of the cell to the user equipment.

Figure 14:
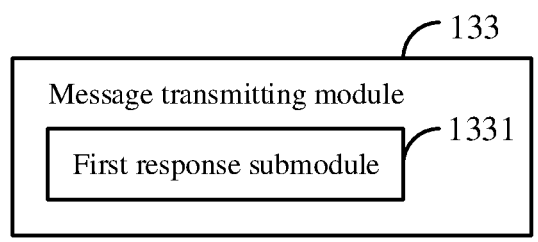
FIG. 14 is a block diagram illustrating a message transmitting module according to an embodiment of the present disclosure.

FIG. 14 is a block diagram illustrating a message transmitting module according to an embodiment of the present disclosure. As shown in FIG. 14, on the basis of the embodiment shown in FIG. 13, the message transmitting module 133 includes:

a first response submodule 1331 configured to transmit a response message associated with the request message to the user equipment, where the response message includes the system information.

Figure 15:
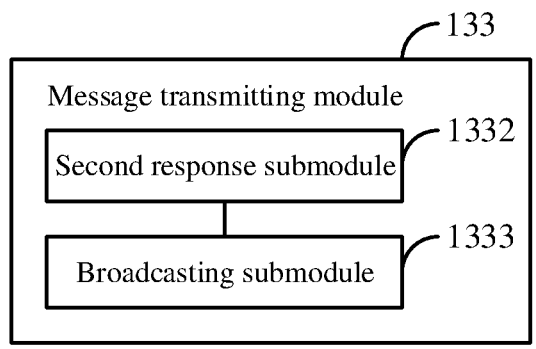
FIG. 15 is a block diagram illustrating another message transmitting module according to an embodiment of the present disclosure.

FIG. 15 is a block diagram illustrating another message transmitting module according to an embodiment of the present disclosure. As shown in FIG. 15, on the basis of the embodiment shown in FIG. 13, the message transmitting module 133 includes:

a second response submodule 1332 configured to transmit a response message to the user equipment in response to the request message, where the response message indicates a time window in which the user equipment receives the system information; and a broadcasting submodule 1333 configured to broadcast the system information.

Figure 16:
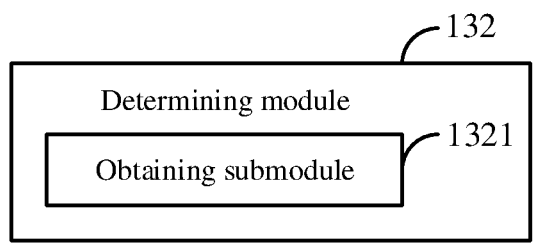
FIG. 16 is a block diagram illustrating a determining module according to an embodiment of the present disclosure.

FIG. 16 is a block diagram illustrating a determining module according to an embodiment of the present disclosure. As shown in FIG. 16, on the basis of the embodiment shown in FIG. 13, the determining module 132 includes:

an obtaining submodule 1321 configured to obtain, in response to that the cell determined based on the indication information of the cell belongs to another base station than the base station, the system information of the cell from the another base station.

The specific manners in which the respective modules of the apparatus in the above embodiments operates have been described in detail in the related method embodiments, and will not be elaborated here.

Since the apparatus embodiments essentially correspond to the method embodiments, reference may be made to the description of related parts of the method embodiments. The apparatus embodiments described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

An embodiment of the present disclosure also provides an electronic device, including:

a processor;

a memory for storing instructions executable by the processor, where the processor is configured to execute the system information reception method described in any of the above embodiments.

An embodiment of the present disclosure also provides an electronic device, including:

a processor;

a memory for storing instructions executable by the processor, where the processor is configured to execute the system information transmission method described in any of the above embodiments.

An embodiment of the present disclosure also provides a computer-readable storage medium storing a computer program that, when executed by a processor, implements the system information reception method described in any of the above embodiments.

An embodiment of the present disclosure also provides a computer-readable storage medium storing a computer program that, when executed by a processor, implements the system information transmission method described in any of the above embodiments.

Figure 17:
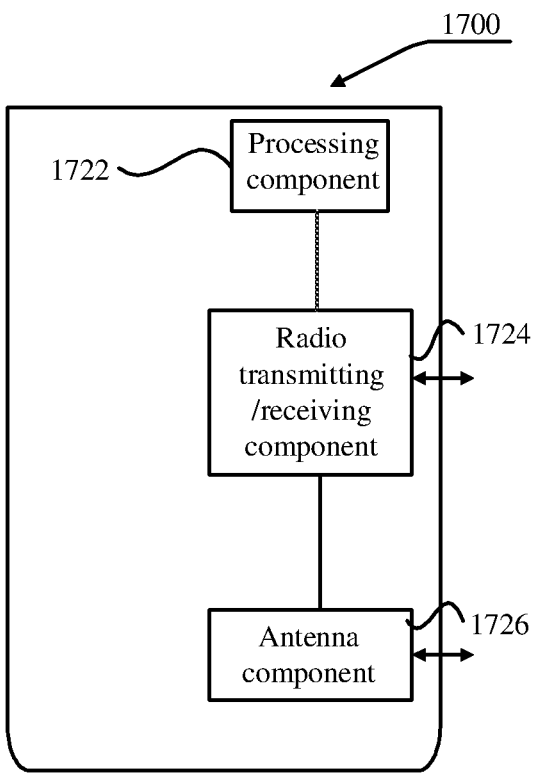
FIG. 17 is a structural diagram illustrating a system information transmission apparatus according to an embodiment of the present disclosure.

As shown in FIG. 17, FIG. 17 is a structural diagram illustrating a system information transmission apparatus 1700 according to an embodiment. The apparatus 1700 may be provided as a base station. With reference to FIG. 17, the apparatus 1700 may include a processing component 1722, a radio transmitting/receiving component 1724, an antenna component 1726, and a signal processing part unique to a radio interface, and the processing component 1722 may further include one or more processors.

One of the processors of the processing component 1722 may be configured to execute the system information transmission method described in any of the above embodiments.

Figure 18:
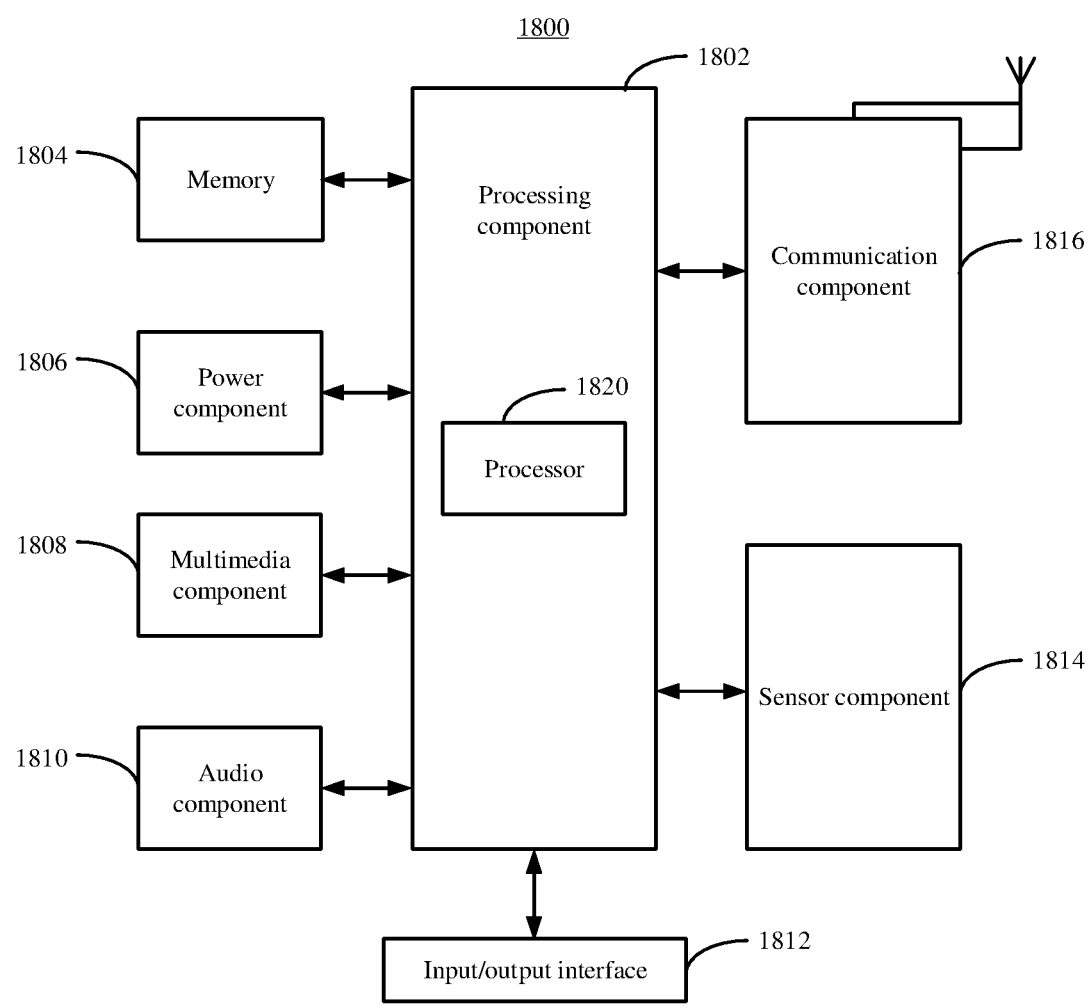
FIG. 18 is a structural diagram illustrating a system information reception apparatus according to an embodiment of the present disclosure.

FIG. 18 is a structural diagram illustrating a system information reception apparatus 1800 according to an embodiment. For example, the apparatus 1800 may be a mobile phone, a computer, a digital broadcasting terminal, a messaging device, a game console, a tablet device, a medical device, a fitness device, a personal digital assistant, etc.

With reference to FIG. 18, the apparatus 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 generally controls the overall operations of the apparatus 1800, such as operations associated with display, telephone calls, data communications, camera operations, and recording operations. The processing component 1802 may include one or more processors 1820 to execute instructions to complete all or part of the steps of the above method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operation at the apparatus 1800. Examples of such data include instructions for any application or method operating on the apparatus 1800, contact data, phone book data, messages, pictures, videos, and so on. The memory 1804 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power component 1806 provides power to various components of the apparatus 1800. The power component 1806 may include a power management system, one or more power sources, and other components associated with generating, managing, and distributing power for the apparatus 1800.

the multimedia component 1808 includes a screen between the apparatus 1800 and the user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure related to the touch or sliding operation. In some embodiments, the multimedia component 1808 includes a front camera and/or a rear camera. When the apparatus 1800 is in an operation mode, such as a shooting mode or a video mode, the front camera and/or the rear camera may receive external multimedia data. Each front and rear camera can be a fixed optical lens system or have focal length and optical zooming capabilities.

The audio component 1810 is configured to output and/or input audio signals. For example, the audio component 1810 includes a microphone (MIC) that is configured to receive an external audio signal when the apparatus 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker for outputting audio signals.

The I/O interface 1812 provides an interface between the processing component 1802 and a peripheral interface module. The peripheral interface module may be a keyboard, a click wheel, a button, or the like. These buttons may include, but are not limited to, a home button, a volume button, a start button, and a lock button.

The sensor component 1814 includes one or more sensors for providing the apparatus 1800 with status assessment in various aspects. For example, the sensor component 1814 can detect an open/closed state of the apparatus 1800, a relative positioning of components, such as the display and keypad of the apparatus 1800 and the sensor component 1814 can also detect a change in position of the apparatus 1800 or a component of the apparatus 1800, the presence or absence of user contact with the apparatus 1800, orientation or acceleration/deceleration of the apparatus 1800, and temperature change of the apparatus 1800. the sensor component 1814 may include a proximity sensor configured to detect the presence of nearby objects without any physical contact. The sensor assembly 1814 may also include a light sensor, such as a Complementary Metal-Oxide-Semiconductor (CMOS) or Charged Coupled Device (CCD) image sensor, for use in imaging applications. In some embodiments, the sensor component 1814 may further include an acceleration sensor, a gyro sensor, a magnetic sensor, a pressure sensor, or a temperature sensor.

The communication component 1816 is configured to facilitate wired or wireless communication between the apparatus 1800 and other devices. The apparatus 1800 may access a wireless network based on a communication standard, such as Wi-Fi, 2G, 3G, or a combination thereof. In an exemplary embodiment, the communication component 1816 receives broadcast signals or broadcast related information from an external broadcast management system via a broadcast channel In one exemplary embodiment, the communication component 1816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1800 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic components for performing the system information reception method as described in any of the above embodiments.

In an exemplary embodiment, there is also provided a non-transitory computer-readable storage medium including instructions, such as the memory 1804 including instructions executable by the processor 1820 of the apparatus 1800 to implement the above method. For example, the non-transitory computer-readable storage medium may be a ROM, a random access memory (RAM), a CD-ROM, a magnetic tape, a floppy disk, and an optical data storage device.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described structures shown in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relationship or order existing between these entities or operations. Also, the terms "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the elements.

The methods and apparatuses provided by the embodiments of the present disclosure have been described in detail above. Specific examples are used to explain the principles and implementations of the present disclosure. At the same time, those of ordinary skill in the art may apply some changes in the specific implementation and the scope of application based on the idea of the present disclosure. In conclusion, the content of the present specification should not be construed as any limitation to the present disclosure.

The invention claimed is:

1. A system information reception method, being applied to user equipment, and comprising:
    determining a cell of which system information is to be obtained;
    transmitting a request message to a base station for requesting the system information of the cell, wherein in response to at least one of the cell not being a primary cell or the cell not belonging to a secondary cell group, the request message comprises indication information of the cell, and in response to the cell being the primary cell or the cell belonging to the secondary cell group, the request message comprises no indication information of the cell; and receiving the system information of the cell from the base station;

wherein the user equipment is configured with a master cell group and a secondary cell group, in response to the cell of which the system information is to be obtained belonging to the master cell group, transmitting the request message to the base station for requesting the system information of the cell comprises:

transmitting the request message to a master base station corresponding to the master cell group through a signaling radio bearer of the master base station; and in response to the cell of which the system information is to be obtained belonging to the secondary cell group, transmitting the request message to the base station for requesting the system information of the cell comprises:

transmitting the request message to a secondary base station corresponding to the secondary cell group through a signaling radio bearer of the secondary base station.

2. The method of claim 1, wherein the cell is a serving cell to the user equipment, and the request message comprises a radio resource control message.

3. The method of claim 1, wherein the cell is a non-serving cell to the user equipment, and the request message comprises at least one of a radio resource control message, or a first message or a third message of random access.

4. The method of claim 1, wherein the indication information of the cell comprises at least one of a global network unique cell identity of the cell or a cell index of the cell.

5. The method of claim 1, wherein receiving the system information from the base station comprises:

receiving a response message which is transmitted by the base station to the user equipment in response to the request message; and obtaining the system information from the response message.

6. The method of claim 1, wherein receiving the system information from the base station comprises:

receiving a response message which is transmitted by the base station to the user equipment in response to the request message;

determining a time window for receiving the system information based on the response message; and receiving the system information broadcast by the base station in the time window.

7. The method of claim 1, wherein receiving the system information from the base station comprises:

determining a time window for receiving the system information based on pre-stored configuration information; and receiving the system information broadcast by the base station in the time window.

8. User equipment, comprising:

a processor; and a memory for storing instructions executable by the processor, wherein the processor is configured to:

determine a cell of which system information is to be obtained;

transmit a request message to a base station for requesting the system information of the cell, wherein in response to at least one of the cell not being a primary cell or the cell not belonging to a secondary cell group, the request message comprises indication information of the cell, and in response to the cell being the primary cell or the cell belonging to the secondary cell group, the request message comprises no indication information of the cell; and receive the system information of the cell from the base station;

wherein the user equipment is configured with a master cell group and a secondary cell group, and the processor is further configured to:

in response to the cell of which the system information is to be obtained belonging to the master cell group, transmit the request message to a master base station corresponding to the master cell group through a signaling radio bearer of the master base station; and in response to the cell of which the system information is to be obtained belonging to the secondary cell group, transmit the request message to a secondary base station corresponding to the secondary cell group through a signaling radio bearer of the secondary base station.

9. The user equipment of claim 8, wherein the indication information of the cell comprises at least one of a global network unique cell identity of the cell or a cell index of the cell.

10. The user equipment of claim 8, wherein in receiving the system information from the base station, the processor is further configured to:

receive a response message which is transmitted by the base station to the user equipment in response to the request message; and obtain the system information from the response message.

11. The user equipment of claim 8, wherein in receiving the system information from the base station, the processor is further configured to:

receive a response message which is transmitted by the base station to the user equipment in response to the request message;

determine a time window for receiving the system information based on the response message; and receive the system information broadcast by the base station in the time window.

12. The user equipment of claim 8, wherein in receiving the system information from the base station, the processor is further configured to:

determine a time window for receiving the system information based on pre-stored configuration information; and receive the system information broadcast by the base station in the time window.

* * * * *